July 11, 1967     A. D. C. STUCKEY     3,330,074

MACHINE TOOL BACKREST

Filed Dec. 7, 1964

United States Patent Office 3,330,074
Patented July 11, 1967

3,330,074
MACHINE TOOL BACKREST
Albert D. C. Stuckey, Cincinnati, Ohio, assignor to The Cincinnati Milling Machine Co., Cincinnati, Ohio, a corporation of Ohio
Filed Dec. 7, 1964, Ser. No. 416,442
5 Claims. (Cl. 51—105)

The present invention relates to an automatically adjustable machine tool backrest which supports a workpiece during a machining operation, particularly suitable for the support of a long cylindrical shaft which is rotated between centers for a grinding operation thereon.

A conventional workpiece backrest in a machine tool has a spring which tends to move the backrest toward the workpiece as the workpiece diminishes in size. Sometimes, the spring force acts through a high leverage system with friction which makes the backrest virtually unyieldable when supporting the workpiece. The spring force must be large enough to overcome the friction in the backrest, particularly the static friction which tends to hold the backrest from advancing as the workpiece diminishes in size. However, if the workpiece is, for example, a long, relatively thin, shaft, the backrest can deflect the workpiece into the grinding wheel when the spring suddenly overcomes the static friction force. This results in an uneven grind on the workpiece.

In the present invention, a backrest is provided which is moved, when the workpiece diminishes in size due to the grind, by a force large enough to overcome the friction of the system but which diminishes as the backrest advances. The force which advances the backrest ceases automatically when the backrest is fully engaged with the workpiece so the backrest cannot push the workpiece into the grinding wheel. In the preferred form of the invention, the movement of the backrest is controlled by a pneumatic servo system which responds to the position of the backrest relative to the workpiece to stop the backrest. The backrest is moved through a high leverage system so that it will not yield when the grinding force momentarily increases on the workpiece due, for example, to out of roundness in the workpiece or other irregularity. Thus, a positve, firm, support is provided for the workpiece by a backrest which will follow the workpiece as it diminishes in size but which will not push the workpiece into the grinding wheel.

It is therefore one object of the present invention to provide an improved automatically adjustable backrest. It is yet another object of the present invention to provide a backrest which will follow the surface of the workpiece as the workpiece diminishes in size, but will not urge the workpiece into the grinding wheel. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2:
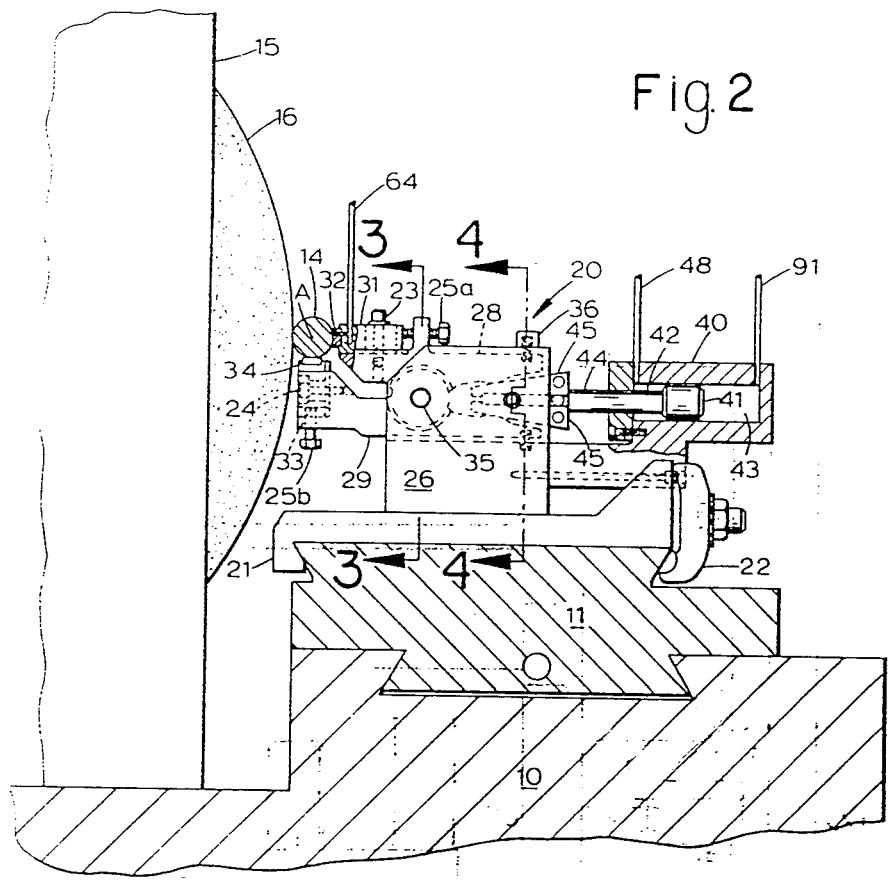
FIG. 2 is a view taken on the line 2—2 of FIG. 1.
Figure 3:
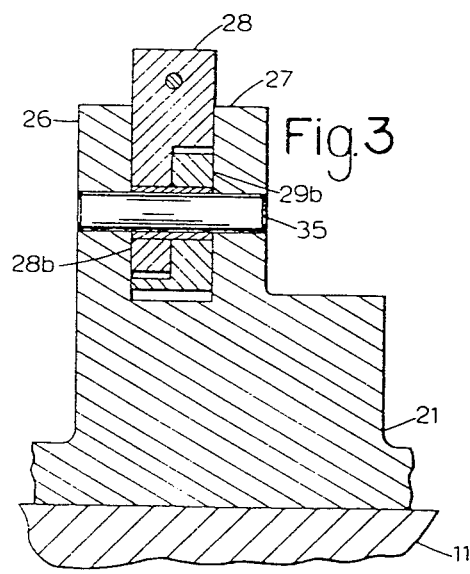
Figure 4:
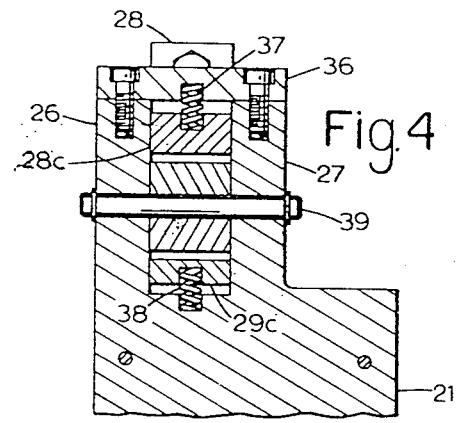

FIGS. 3 and 4 are views taken on the lines 3—3 and 4—4 of FIG. 2; and

Figure 5:
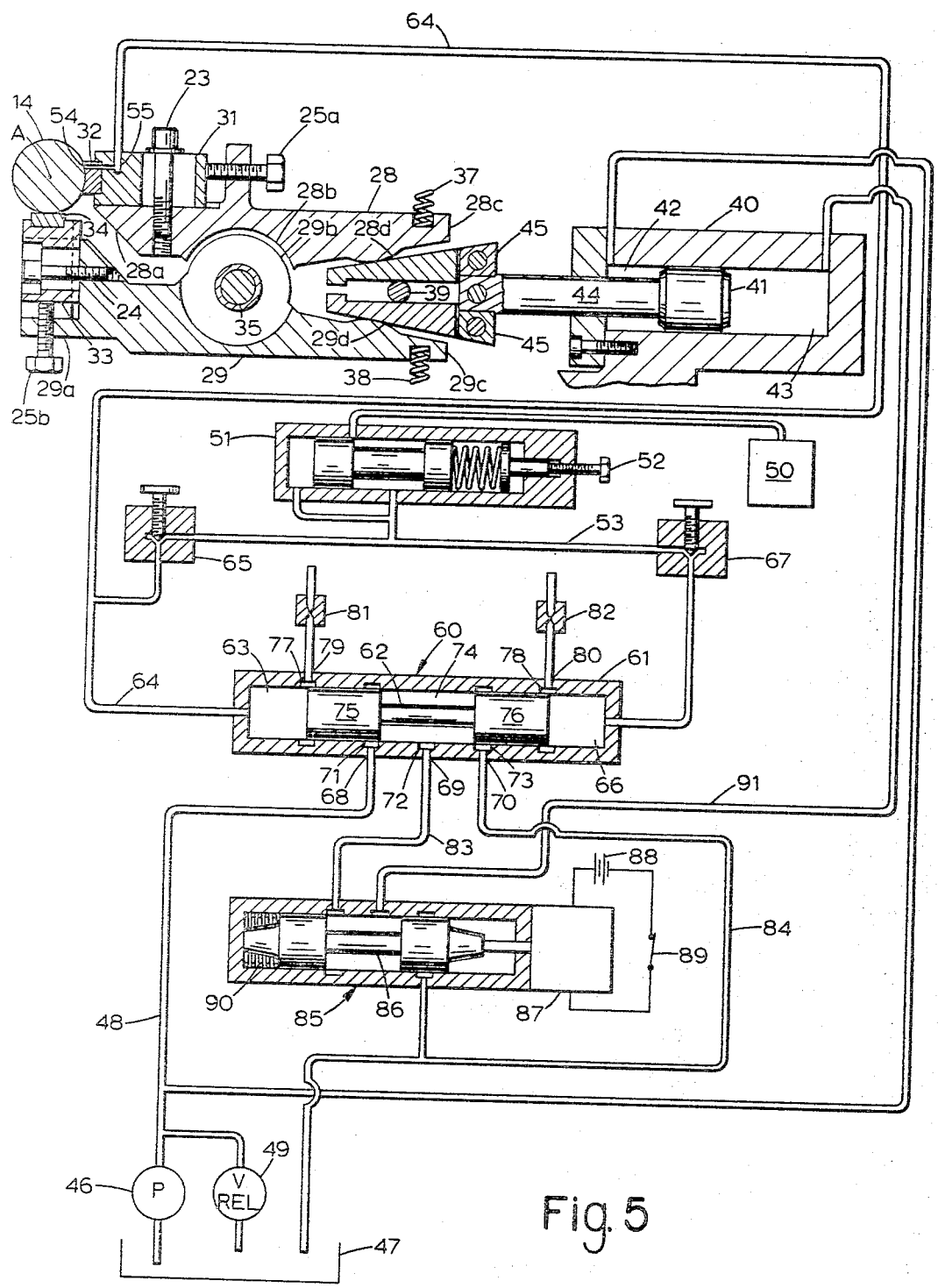

FIG. 5 is a schematic diagram of the backrest and operating mechanism therefor.

Figure 1:
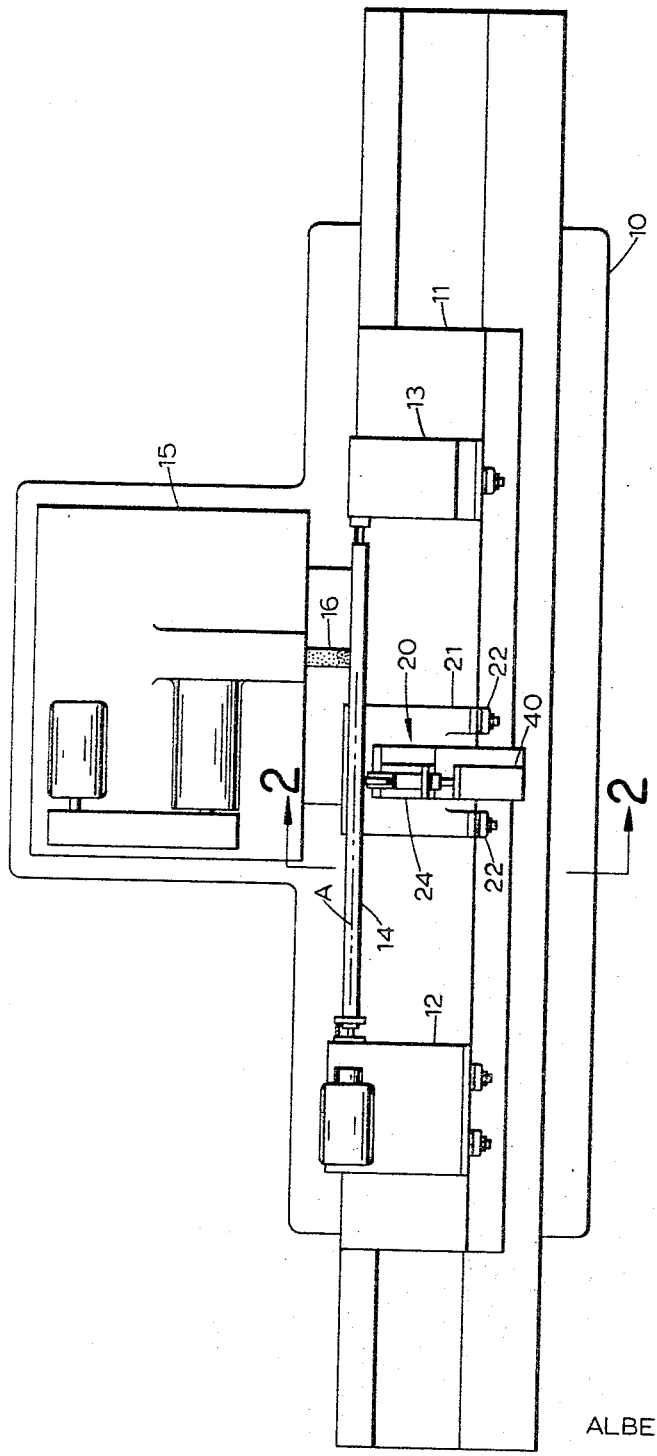
FIG. 1 is plan view of a center-type grinding machine incorporating the mechanism of the present invention.

There is shown in FIG. 1 the bed 10 of a center type grinding machine. A table 11 is mounted on the bed 10 for movement to the right and left as viewed in FIG. 1. A headstock 12 and a tailstock 13 are mounted on the table 11 and support a workpiece 14, which is rotated by the headstock on an axis of rotation A. A wheelhead 15, which carries a rotatable grinding wheel 16, is mounted on the bed for movement towards and away from the workpiece.

A backrest, indicated generally at 20, to support the workpiece against the thrust of the grinding wheel, is mounted on the table 11. The backrest has a base 21 which is secured to a dovetail on the table by clamps 22. The base 21 has two upstanding spaced apart walls 26 and 27. A first lever 28 has one end 28a extending toward the workpiece, a central hub portion 28b, and an opposite end 28c extending away from the workpiece. A second lever 29 has one end 29a extending toward the workpiece, a central hub portion 29b, and an opposite end 29c extending away from the workpiece. The first lever 28 has a block 31 secured by bolt 23 on the end 28a adjacent the workpiece. The block 31 is adjustable (by set screw 25a when bolt 23 is loosened), towards and away from the workpiece. The block 31 has a carbide shoe 32 (on a horizontal line through axis A) adapted to engage the workpiece. The second lever 29 has a block 33 secured by bolt 24 on the end 29a adjacent the workpiece. The block 33 is adjustable (by set screw 25b when bolt 24 is loosened) towards and away from the workpiece. The block 33 has a carbide shoe 34 (on a vertical line through axis A) adapted to engage the workpiece. Both hub portions of the levers are pivotally mounted on a pin 35 which is received in, and extends between, the two walls 26 and 27. The end portions 28c, 29c have inner contact surfaces 28d, 29d and, when the shoes 32 and 34 are engaged with a workpiece, the inner contact surfaces 28d, 29d are spaced apart with a small included angle (of, say, ten degres) therebetween. A crossbar 36 is mounted on top of walls 26 and 27, and a spring 37 received between crossbar 36 and end portion 28c of lever 28 urges that end portion toward end portion 29c of lever 29. Similarly, a spring 38 received between base plate 21 and end portion 29c of lever 29 urges that end portion toward end portion 28c of lever 28. Spreading the lever end portions 28c and 29c apart moves the shoes 32, 34 inwardly with respect to the workpiece (substantially along lines emanating radially from axis A). Conversely, movement of the end portions 28c, 29c together by springs 37 and 38 moves both shoes 32 and 34 away from the workpiece.

In a grinding operation on an elongated, cylindrical shaft (such as the shaft 14), the table 11 is positioned with one end of the workpiece in registration with the grinding wheel. Wheelhead 15 is advanced until the grinding wheel 16 is in abrading contact with the workpiece. Table 11 is then traversed until the entire length of the workpiece has passed the grinding wheel. The wheelhead is then stepped inwardly an incremental amount, and table 11 is again operated so that another grinding pass is taken on the workpiece. During any given grinding operation on the workpiece, several passes will be take and, on each pass, the workpiece will diminish in diameter an increment twice the span the wheelhead is moved inwardly at the beginning of the pass.

The shoes 32 and 34 are engaged with the workpiece, either at the beginning of a grinding operation or, if not engaged with the workpiece at the beginning of the grinding operation, they are brought up into engagement with the workpiece during the grinding operation. In either event, the shoes, if they remain stationary after they are brought into engagement with workpiece, will be effective to support the workpiece only momentarily, since the workpiece, on each incremental infeed movement of the wheelhead and subsequent pass of the workpiece, diminishes in size so the workpiece would recede from stationary shoes. Consequently, it is known to provide motive power for the backrest to move the shoes toward the axis of the workpiece. It is important, however, that the shoes do not deflect the workpiece off the axis A and toward the grinding wheel since this deflection will gouge the workpiece and, possibly, remove more stock therefrom than is desired.

A cylinder 40 has a piston 41 slidably received therein which divides the cylinder into two chambers 42, 43. A piston rod 44 connected to the piston extends through chamber 42 and out through the end of the cylinder 40. A V-shaped, double wedge block 45 is connected to the end of the piston rod 44 and is received over guide rod 39 for horizontal movement thereon. The wedge block 45 is received between the contact surfaces 28d and 29d of the first and second levers 28, 29 to spread the lever end portions 28c and 29c apart on horizontal movement of wedge block 45 to the left (as viewed in FIGS. 2 and 5).

A motor driven hydraulic pump 46 takes fluid from a sump 47 and delivers it under pressure to a hydraulic pressure line 48. A relief valve 49 opens to return fluid to sump 47 only when a predetermined safe pressure is exceeded in presure line 48. A source 50 of air under pressure is connected to an air regulator valve 51 which delivers air at a constant predetermined pressure (determined by the setting of set screw 52) to a pneumatic pressure line 53. The shoe 32 has an orifice 54 and a passage 55 extending through the block and shoe to the orifice.

A valve 60 has a housing 61 and a movable valve member 62 slidably received therein. An air chamber 63 in the housing at one end of valve member 62 is connected by line 64 to passage 55 and through restriction 65 (which may, for example, be a needle valve) to air line 53. An air chamber 66 in housing 61 at the opposite end of valve member 62 is connected through restriction 67 (identical to restriction 65) to air line 53. The valve housing 61 has three ports 68, 69, and 70 which lead, respectively, to annular groove 71, opening 72, and annular groove 73. Valve member 62 has an annular passage 74 between spools 75 and 76 thereof. When valve member 62 is in a central position, spools 75 and 76 block grooves 71 and 73, respectively. With the valve member 62 in this position, two annular grooves 77 and 78 are partially blocked, respectively, by spools 75 and 76 and partially exposed, respectively, to chambers 63 and 66. Grooves 77 and 78 are connected to ports 79 and 80 which, in turn, exhaust to the atmosphere through restrictions 81 and 82, respectively. When the valve member 62 is moved to the left (from the position shown in FIG. 5), passage 74 connects opening 72 to groove 71, and hence connects port 69 to port 68. Groove 77 becomes blocked by spool 75 and groove 78 opens farther. When the valve member 62 is moved to the right (from the position shown in FIG. 5) passage 74 connects opening 72 to groove 73, and hence port 69 to port 70. Groove 78 becomes blocked by spool 76 and groove 77 opens farther.

Hydraulic pressure line 48 is connected to port 68; an operating line 83 is connected to port 69; and a return line 84 is connected to port 70 and leads to sump 47. A blocking valve 85 has a movable valve member 86. A solenoid 87 is connected to valve member 86 and, when the solenoid is energized by battery 88 on closure of switch 89, the valve member 86 is shifted against the bias of spring 90 to connect operating line 83 to another operating line 91. When the switch 89 is opened, and the solenoid 87 deenergized, spring 90 shifts the valve member 86 to block operating line 83 from operating line 91 and connect the latter operating line to return line 84.

It will be noted that when valve member 62 is in a center position and orifice 54 is blocked, the pressure in air chambers 63 and 66 will be determined by the setting of restrictors 65 and 67. These restrictors are set so the pressures in these chambers are equal with valve member 62 centered and orifice 54 blocked. With a workpiece inserted in the machine, the shoe initially will be retracted therefrom and orifice 54 will be open. Switch 89 is then closed, connecting operating line 83 to 91. With the orifice 54 open, the pressure in chamber 63 becomes lower than the pressure in chamber 66, and valve member 62 shifts to the left (from the position shown in FIG. 5), tending to close groove 77 and open groove 78. This tends to drop the pressure in chamber 66 until the pressure in chambers 63 and 66 are equal. As the valve member 62 shifts to the left, operating line 83 connects to pressure line 48 to supply fluid under pressure through operating line 91 to chamber 43. Since the area of the piston 41 exposed in chamber 43 is substantially larger than the area of piston 41 exposed to chamber 42, and since, at this time, both chambers are at the pressure of pressure line 48, piston 41 and piston rod 44 advance. This spreads end portions 28c and 29c of the first and second levers 28, 29, and moves the shoes 32, 34 toward the workpiece. The instant the shoes engage the workpiece, orifice 54 becomes blocked and the pressure in chamber 63 rises to shift the valve member 62 back to a centered position, where the pressures in chambers 63 and 66 become balanced. With valve 62 centered, fluid ceases to flow to chamber 43 and piston 41 (and rod 44) stop.

As the workpiece diminishes in size, the surface of the workpiece tends to leave shoe 32, allowing air to escape through orifice 54. This immediately drops the pressure in chamber 63, reconnecting chamber 43 to pressure line 48. As soon as the shoe 32 contacts the workpiece to shut off the orifice 54, piston 41 and rod 44 stop. Thus, because of the orifice which acts as a sensing member sending pressure signals to the valve 60 through the sensing line 64, the shoes, although they follow the surface of the workpiece as the workpiece diminishes in size, cannot urge the workpiece into the grinding wheel.

It will be noted that the contact surfaces 28d and 29d are at a small included angle (approximately 10 degrees) and thereby provide, in cooperation with wedge block 45, high leverage betwen piston rod 44 and shoes 32 and 34. A large amount of movement of rod 44 produces a small amount of movement of shoes 32 and 34. For this reason, the friction in the system (as, for example, between wedge block 45 and contact surfaces 28d and 29d) renders the system substantially irreversible. Consequently, the shoes will not yield even under high grinding forces. Thus, there is provided a backrest which follows the workpiece surface but does not push it into the grinding wheel. At the same time, solid, unyieldable support is provided for the workpiece.

What is claimed is:

1. In a grinding machine having a grinding wheel to effect a grinding operation on a workpiece and having means to support and rotate the workpiece on an axis, the combination comprising:
   (a) a backrest having a shoe for engagement with the workpiece,
   (b) hydraulic means to advance the backrest toward said axis as the workpiece diminishes during grinding,
   (c) and a pneumatic servo and means in said shoe responsive to the relative position directly between the shoe and the surface of the workpiece to control the hydraulic movement of the backrest.

2. In a grinding machine having a grinding wheel to effect a grinding operation on an elongated workpiece and having means to support and rotate the workpiece on and axis, the combination comprising:
   (a) a backrest having a shoe for engagement with the workpiece,
   (b) a motor connected to the backrest and operable to move the shoe inwardly as the workpiece diminishes during grinding,
   (c) a pneumatic servo sensing means in said shoe to sense the distance directly between said shoe and the surface of the workpiece, and
   (d) actuating means responsive only to said pneumatic servo sensing means to control operation of said motor.

3. In a grinding machine having a grinding wheel to effect a grinding operation on an elongated workpiece and having means to support and rotate the workpiece on an axis, the combination comprising:
  (a) a backrest having a shoe for engagement with the workpiece,
  (b) a motor connected to the backrest and operable to move the shoe inwardly as the workpiece diminishes during grinding,
  (c) a pneumatic servo sensing means in said shoe to sense the distance directly between said shoe and the surface of the workpiece, and
  (d) a shiftable valve connected for response to said pneumatic servo sensing means and for actuation of said motor to control the operation of the motor in response to operation of said pneumatic servo sensing means.

4. In a grinding machine having a grinding wheel to effect a grinding operation on an elongated workpiece and having means to support and rotate the workpiece on an axis, the combination comprising:
  (a) a backrest having a shoe for engagement with the workpiece,
  (b) a hydraulic motor connected to the backrest and operable to move the shoe radially inwardly as the workpiece diminishes during grinding,
  (c) a pneumatic fluid passage directly in said shoe terminating in an orifice exposed to the surface of the workpiece,
  (d) means to supply fluid under pressure to said passage directly in said shoe, and
  (e) a hydraulic valve connected to have servo communication with the pneumatic fluid passage and for actuation of said motor to control the operation of the motor in response to the pneumatic pressure in said passage directly in said shoe.

5. In a grinding machine having a grinding wheel to effect a grinding operation on an elongated shaft and having means to support and rotate the shaft on an axis, the combination comprising:
  (a) a backrest having a plurality of shoes for engagement with the workpiece,
  (b) a hydraulic motor connected to the backrest and operable to move the shoes radially inwardly as the workpiece diminishes during grinding,
  (c) an air passage directly in one of said shoes terminating in an orifice that is in juxtaposed location immediately adjacent to the surface of the workpiece,
  (d) means to supply air under pressure to said passage in said shoe,
  (e) a source of hydraulic fluid under pressure, and
  (f) a hydraulic valve means including predetermined connection to said air passage, the motor, and the source of fluid under pressure, said valve means having a valve member shiftable in response to the pneumatic pressure in said passage, said shiftable valve member being in a position to block the source of fluid under pressure from the motor when the surface of the workpiece blocks said orifice, said valve member shifting when a gap between the surface of the workpiece and said orifice exists requiring action for connection of the source of hydraulic fluid under pressure to said motor effective for backrest movement into automatcially adjusted position.

References Cited

UNITED STATES PATENTS

| | | | |
|---|---|---|---|
| 2,723,503 | 11/1955 | Mader | 51—238 |
| 2,949,708 | 8/1960 | Wiatt | 51—238 X |
| 3,145,513 | 8/1964 | Porath | 51—238 |

FOREIGN PATENTS

| | | |
|---|---|---|
| 870,656 | 3/1953 | Germany. |
| 712,685 | 7/1954 | Great Britain. |

HAROLD D. WHITEHEAD, *Primary Examiner.*

UNITED STATES PATENT OFFICE
CERTIFICATE OF CORRECTION

Patent No. 3,330,074                July 11, 1967

Albert D. C. Stuckey

It is hereby certified that error appears in the above numbered patent requiring correction and that the said Letters Patent should read as corrected below.

Column 4, line 56, strike out "and", second occurrence.

Signed and sealed this 18th day of June 1968.

EAL)

ttest:

lward M. Fletcher, Jr.
ttesting Officer

EDWARD J. BRENNER
Commissioner of Patents